Oct. 11, 1966  E. HABERKORN  3,278,138
TAKE-OFF ASSIST FOR VTOL AIRCRAFT
Filed April 14, 1964  4 Sheets-Sheet 1
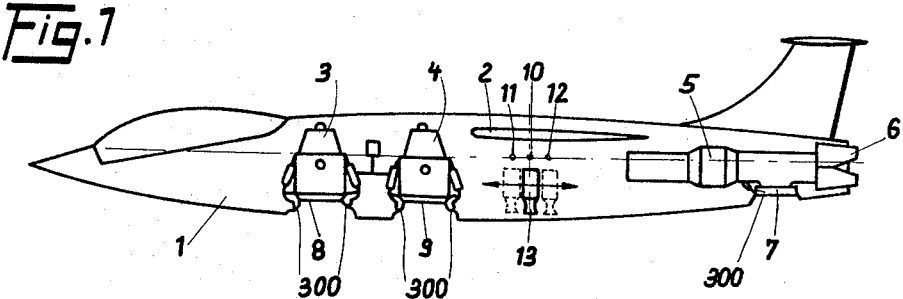
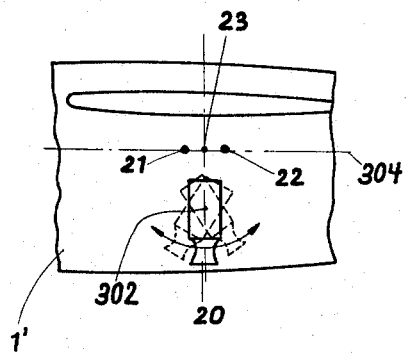
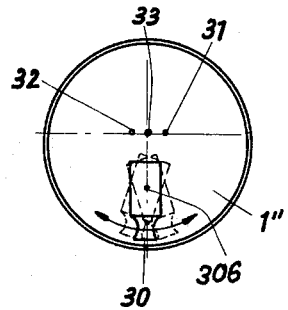
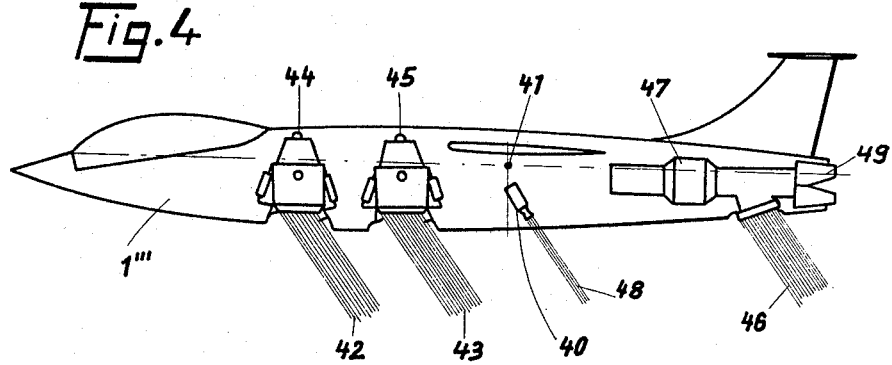
Inventor
ERICH HABERKORN
By Mueller and Tobin
Attorneys

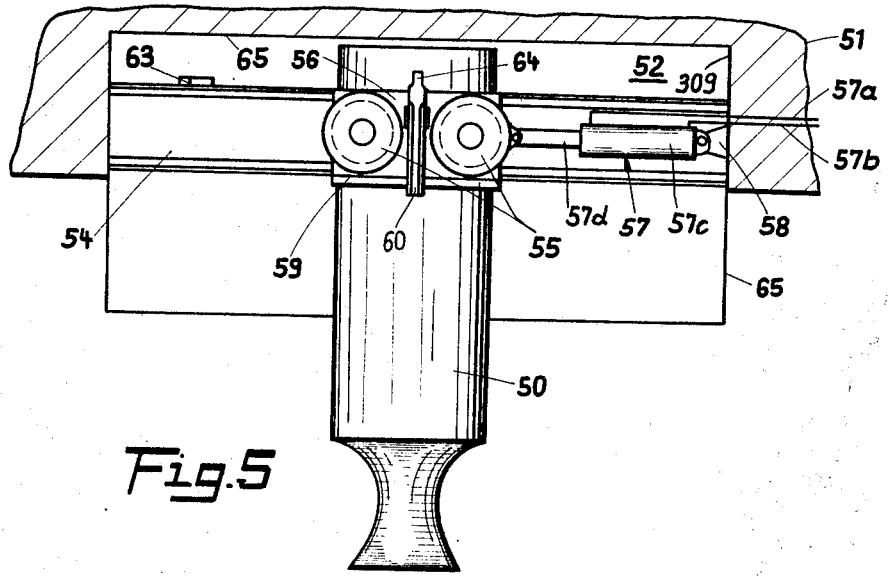
Fig.5
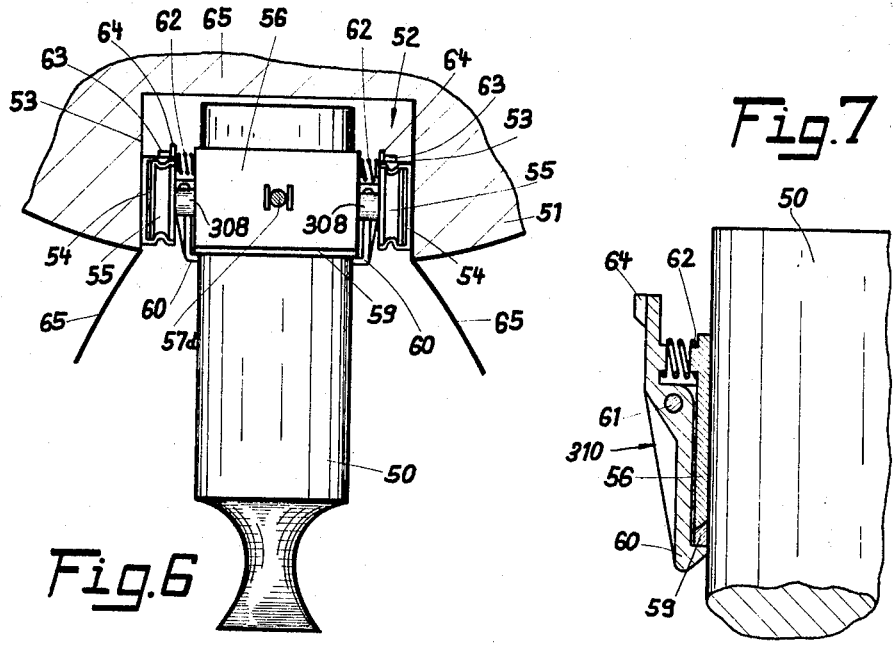
Fig.6
Fig.7
Inventor
ERICH HABERKORN
By McGlew and Toren
Attorneys Oct. 11, 1966 E. HABERKORN 3,278,138
TAKE-OFF ASSIST FOR VTOL AIRCRAFT
Filed April 14, 1964 4 Sheets-Sheet 3

Inventor
ERICH HABERKORN
By *Mulow and Toren.*
Attorneys

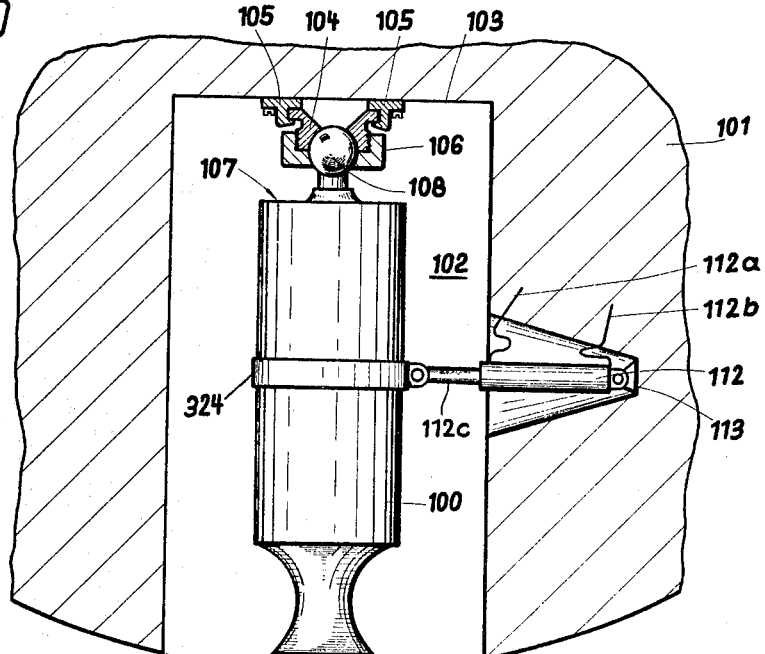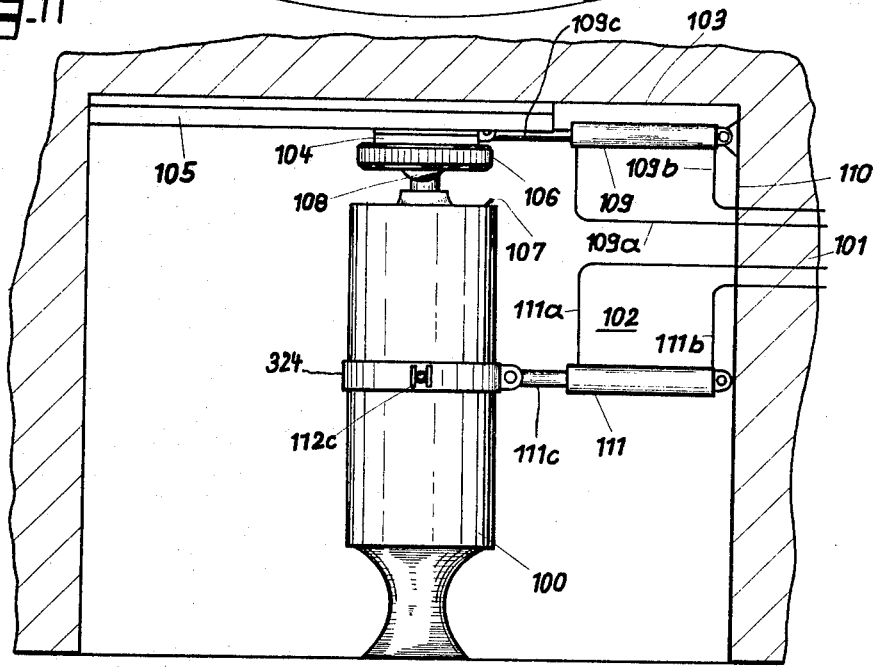

United States Patent Office 3,278,138
Patented Oct. 11, 1966

3,278,138
TAKE-OFF ASSIST FOR VTOL AIRCRAFT
Erich Haberkorn, Riemerling, near Munich, Germany, assignor to Bolkow Gesellschaft mit beschrankter Haftung, Ottobrunn, near Munich, Germany
Filed Apr. 14, 1964, Ser. No. 359,633
Claims priority, application Germany, Apr. 20, 1963, B 71,579
31 Claims. (Cl. 244—12)

This invention relates in general to aircraft construction, and in particular to a new and useful VTOL-type aircraft having a novel arrangement of lift and cruising engines and including an additional rocket take-off assist engine, and to an improved means for mounting the assist engine on the aircraft permitting longitudinal and pivotal movement thereof; and to a method of operating such aircraft.

The present invention has particular reference to the arrangement and employment of a rocket-type assist power plant or engine on an aircraft of the type having air-consuming lift thrust engines arranged ahead and to the rear of the center of gravity of the aircraft. During the vertical take-off of such aircraft, the lifting jets or thrust gases from the lift engine nozzles are directed downwardly toward the ground and induce a field of flow adjacent the aircraft which causes sub-pressures at the underside of the aircraft as well as a temperature increase at the air intakes of the jet engines. As a result, considerable lift losses occur which require special measures.

Where jet engines are employed to direct thrust gases substantially vertically downwardly for lifting purposes, the usual method of reducing lift losses in the vicinity of the ground is to employ jet deflectors which are anchored to the ground and which deflect the downwardly directed jets laterally away from the aircraft. By such means the creation of damaging sub-pressures under the aircraft which reduce the lift capability is redudced and the temperature at the intakes of the thrust engines will not increase materially. An obvious disadvantage of such devices, however, is that the deflector, due to their large size and weight, require special transportation and lifting equipment. In addition, they must be secured to the ground below the plane before each take-off of a VTOL aircraft. Planes of this character may be launched without the use of jet deflectors, but in such instances the take-off weight of the aircraft must be reduced usually by fuel weight reduction in the amount comparable to the lift losses which will ensue. This, of course, shortens the cruising range of the aircraft considerably.

In accordance with the invention, the above disadvantages are overcome by the provision of a take-off assist engine which is operated during take-off and sometimes during transistion to horizontal flight to substantially balance the lift losses of the air-consuming jet engines of the aircraft when the aircraft is adjacent the ground during take-off.

In accordance with the invention, at least one take-off assist rocket engine is attached to the aircraft and the discharge thrust is directed approximately in the direction of the vertical axis of the aircraft to produce a lift at least in the amount of lift losses, which will only be encountered by the air-consuming jet engines when under ground influence. The combustion time of such a rocket assist engine is at least equivalent to the climbing time of the aircraft within ground influence.

Ground influence is effective only up to a few yards above the ground and climbing to this level only takes a few seconds. Therefore the take-off assist engine, which preferably employs a solid propellant charge, is designed for a correspondingly short combustion time. Such a construction of engine, however, results in a very advantageous low proportionate weight of rocket engine to the resultant lift produced by such engine in the order of magnitude of about 0.05. Thus the weight of the fully charged rocket adds only insignificantly to the take-off weight of the aircraft. The reduction in fuel weight corresponding to the take-off weight of the aircraft does not significantly shorten the range of the aircraft. For example, a take-off assist rocket designed for a loss of lift caused by ground influence up to 2,000 lbs. would have a weight of about 100 lbs. only.

On the other hand, the rocket lift can be made so strong that the increase in take-off weight by the additional weight of the rocket is permissible. In this event the fuel weight need not be diminished.

A further aspect of the invention is in the particular mounting of the take-off assist engine. Apart from the fact that such take-off assist engines can be transported to an improvised starting place more easily than jet deflectors, mounting of the engine on the aircraft requires no lifting tools, since the engine is relatively light, and a single man, possibly the pilot himself, can mount a charged rocket on the plane. It is also possible to use several such take-off assist rockets, and in such case the rockets are designed so that their combined lift at least equals the ground lift losses to which the remaining engines will be subjected.

In an advantageous embodiment of the invention, at least one take-off assist rocket is detachably mounted on transmission means which are located on the aircraft or in the aircraft, preferably in the vicinity of the center of gravity of the aircraft. For aircraft generally shifting of the center of gravity due to differing load distribution in an amount from 8 to 10% of the main wing chord is permissible. The center point of lift, that is, the intersection of the line of action of the resulting lift and the plane formed by the transverse and longitudinal axes of the aircraft must be capable of following the shifting center of gravity in order to avoid any unbalancing effects about the transverse and longitudinal axes of the aircraft in jet carried flight attitudes.

Since a movable suspension of air-consuming jet engines is generally too expensive, the shifting of the lift center point is obtained by special control nozzles which are a principal feature of the aircraft construction to which the invention particularly pertains. Control is also obtained by throttling individual lift-off engines. By such measures, however, considerable lift losses are incurred which are not permissible during the take-off phase.

The transmission means for detachably mounting the rocket engines advantageously includes a movable suspension permitting shifting of the rocket engine during take-off for varying both the angle and location of the generally downward thrust which is produced. The rocket may thus be used to insure that the aircraft is kept in equilibrium about its horizontal axis despite the travel of the center of gravity and without employing any other measures for shifting the lift center point. For accomplishing the movement of the rocket engine, the movement range of the rocket is placed so that the medium of the movement stroke coincides with the medium position of the vertical axis of the aircraft, as related to the shifting of the center of gravity. The length of the movement range is advantageously at least sufficient to fully offset any effects around the horizontal axis of the aircraft resulting from the permissible shifting of the center of gravity.

In addition, the line of action of the take-off assist rockets, in accordance with the invention, may be placed outside the range of the center of gravity so that, individual jet lift engines can undergo a temporary efficiency increase or change in thrust output without disturbing the equilibrium about the horizontal axis of the aircraft. For example, the take-off assist rockets can be adjusted in position in accordance with a loading chart and thereafter moved in accordance with take-off experience and encountered flight conditions to maintain the aircraft in equilibrium.

In a further embodiment of the invention, the take-off assist rocket is mounted on transmission means which is movable along the longitudinal axis of the aircraft or includes pivoting means to permit the rocket thrust gases to be deflected angularly away from the vertical, the arrangement being such that either movement may be made selectively during the operation of the aircraft at takeoff. Although the tilting movement of the rocket from its vertical position produces a component of the rocket lift which acts in direction along the longitudinal axis of the aircraft, such component is insignificant in view of the small tilting angles which are required for compensating for the shift of the center of gravity. Larger tilting angles in the direction of flight are advantageous for supporting the transition from lift to forward flight. In such cases the significant horizontal component of the rocket lift contributes to the horizontal acceleration of the aircraft. By mounting a rocket so that it can be tilted, it is especially easy to maneuver the aircraft during vertical take-off and subsequent forward flight, and the arrangement of the invention provides means for effecting a smooth transition between each stage of flight. The equilibrium about the horizontal axis of the aircraft can be maintained even during the transition by moving the take-off assist rocket as required. The pivotability of the mounting of the rocket makes it possible to counteract unbalancing disturbances and to maintain equilibrium about the longitudinal axis of the aircraft as well as the transverse axis, where such disturbances are caused, for example, by the shifting of the center of gravity or wind gusts.

In a preferred arrangement, the harness or mounting means for the rocket assist engine preferably includes a carriage for moving the rocket backwardly and forwardly along the longitudinal axis forwardly and aft of or to each side of the center of gravity. Such mounting means also include a mechanism or control for pivoting the rocket such that the thrust produced thereby is deflected angularly away from the vertical. In a preferred arrangement, the mounting and moving means for the rocket include a simple carriage or mounting frame for instantly latching and then subsequently releasing the rocket in a simple manner. The rocket may be merely positioned into the carriage, for example, by deflecting latching members outwardly and permitting them to engage around the rocket. It may be dropped from the harness during flight, if desired.

In some instances the harness is mounted within the center portion of the underside of the aircraft, and in other instances the harness for the rocket engine is mounted on the exterior of the aircraft. Suitable controls for the manipulation of the rocket both in longitudinal direction and also for pivotal movement are advantageously incorporated in the pilot's cockpit so that they may be manipulated during take-off and transition to level flight.

In accordance with a preferred method of the invention, the aircraft is operated by using the forward lift engines and the lift nozzle of the aft engine, which is preferably a combination cruising and lift engine, as well as the rocket at take-off. The rocket is initially positioned so that it discharges substantially vertically downwardly during take-off. Thereafter the rocket is shifted to counteract any unbalancing forces acting on the aircraft and to aid in the transition to level flight. As a further modification of the method, the lift engines are provided with means for deflecting the thrust gases for effecting a transition to forward flight and for control purposes, and the rocket engine is also employed for offsetting any unbalancing conditions in the aircraft which are produced by such gas deflections.

Accordingly, it is an object of the invention to provide an aircraft construction having air-consuming lift engines located before and after the center of gravity and arranged to discharge gases downwardly for lift purposes and including a take-off assist rocket mounted on said aircraft adjacent the center of gravity thereof.

A further object of the invention is to provide an aircraft of the type having air-consuming lift-off engines with improved means for movably mounting a rocket take-off assist engine thereon.

A further object of the invention is to provide mounting means for mounting an auxiliary take-off assist engine on an aircraft.

A further object of the invention is to provide a harness mounting assembly, particularly for mounting a take-off assist engine such as a rocket on an aircraft having a plurality of air-consuming lift engines, which harness comprises a rocket holding carriage which is displaceably mounted on the aircraft, and further including means adjacent the carriage for moving and/or pivoting the carriage with the rocket thereon.

A further object of the invention is to provide a method for operating an aircraft using a lift engine both ahead and behind the center of gravity, which consumes air and which is subject to ground effect loss, by the use of a movably mounted rocket assist engine comprising taking off with the lift engines and the rocket assist engine in operation and moving the rocket assist engine during take-off and transition to level flight for the purposes of maintaining aircraft equilibrium.

A further object of the invention is to provide an aircraft having a means for mounting a take-off assist engine which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

In the drawings:

FIG. 1 is a somewhat schematic side elevational view of a VTOL aircraft having a take-off assist rocket constructed in accordance with the invention;

FIG. 2 is a partial view similar to FIG. 1 indicating an aircraft with a rocket mounted for longitudinal pivotal movement;

FIG. 3 is a transverse section through an aircraft similar to that indicated in FIG. 1, but indicating another embodiment in which the assist rocket is mounted for transverse pivotal movement within the body of the aircraft;

FIG. 4 is a side elevational view similar to FIG. 1 of another embodiment of the invention, with the rocket engine mounted for both longitudinal and pivotal movement;

FIG. 5 is an enlarged longitudinal sectional view in the vicinity of the mounting of the rocket in the body of an aircraft similar to that indicated in FIG. 1;

FIG. 6 is a transverse sectional view of the enlarged portion indicated in FIG. 5;

FIG. 7 is a greatly enlarged detail of the latching machanism for the rocket harness shown in FIG. 5;

FIG. 10 is a view similar to FIG. 6 of still another embodiment of the invention; and FIG. 11 is a side view of the embodiment indicated in FIG. 10.

Figure 8:
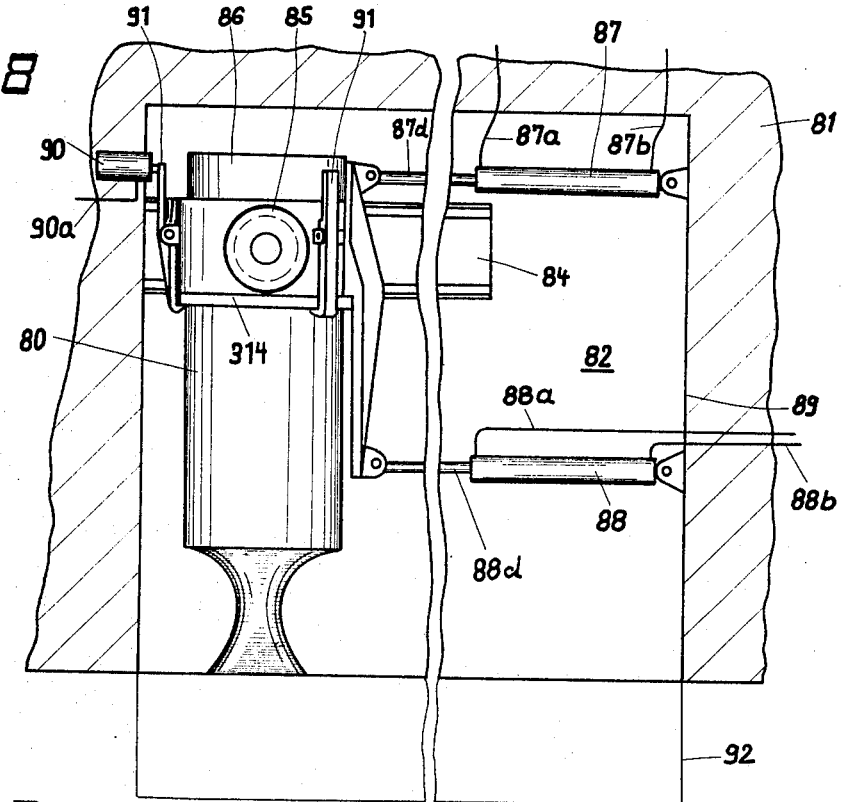
FIG. 8 is an enlarged fragmentary sectional view similar to FIG. 5 of another embodiment of the invention.

Referring to the drawings in particular, the invention is embodied on a vertical take-off or landing aircraft (VTOL) which comprises a body or fuselage having a wing 2 located in the vicinity of the center of gravity. The aircraft is of a type in which the pilot flies in the pilot space at the forward end of the fuselage 1.

In the embodiment illustrated, the aircraft carries lift engines 3 and 4 in front of the center of gravity and a combination cruising and lifting engine 5 in the rear of the center of gravity. The combination cruising and lift engine 5 includes means for selectively directing thrust gases either substantially horizontally through thrust nozzle 6 for forward propulsion during cruising or substantially vertically downwardly through lifting nozzle 7 during take-off and landing. All of the engines 3, 4 and 5 are of a type which consume air and which discharge thrust gases, and each includes means such as deflectors 300, 300, 300 for deflecting the thrust gases in either lateral or longitudinal directions at the discharge of the nozzles 8, 9 and 7 of the engines 3, 4 and 5, respectively. Means (not shown) are provided in the engine 5 for changing over from a condition in which the gases are directed from the lift nozzle 7 to a condition in which the gases are directed from the cruising nozzle 6.

The center of gravity of the aircraft may shift due to different load distribution and weight from a middle position indicated 10 to the foremost position 11 as well as to a rearmost position 12. Within this range of permissible shifting of the center of gravity, a take-off assist rocket 13 is suspended on the fuselage advantageously in the lower half thereof.

In accordance with the inventive embodiment illustrated in FIG. 1, the rocket 13 is mounted for displaceable movement in longitudinal directions as indicated by the arrows and dotted lines. The rocket 13 advantageously is of a type containing a solid propellant and the thrust gases exiting therefrom are discharged substantially vertically downwardly. The range of movement of the rocket in longitudinal direction is at least far enough to the front and to the rear so that it may be employed for maintaining equilibrium about the transverse axis of the aircraft even during the extreme positions of shift of the center of gravity to the locations 11 and 12.

The aircraft indicated in FIG. 1 advantageously includes a similar set of engines 3, 4 and 5 on the opposite side thereof and at the same longitudinal locations. The rocket 13 is indicated as being mounted on a side of the fuselage 1 and in the construction indicated it would be preferable to pivot another rocket 13 on the other side of the aircraft.

In FIG. 2 there is indicated another embodiment of the invention in which the rocket 20 is pivotally mounted so that it may be pivoted about a point 302 on an aircraft fuselage 1'. The axis 302 is located below the longitudinal axis of the aircraft and the pivoting range of the rocket 20 is designed so that in the foremost position, at which the axis of the rocket 20 intercepts the longitudinal axis 304 at the point 21, the intercept point will be spaced forwardly of the center of gravity 23, and when shifted in an opposite direction, the axis will intersect with the longitudinal axis 304 at 22. With the center of gravity in its medium position 23, the line of action of the take-off assist rocket 20 coincides with the vertical axis of the aircraft.

In FIG. 3 another embodiment is indicated in which a rocket 30 is pivotally mounted within the body of fuselage 1". In this embodiment the rocket 30 is mounted for pivotal movement in transverse directions, indicated by double arrows, about an axis 306 which is parallel to the longitudinal axis of the aircraft and which runs below the center of gravity 33. The thrust center line will thus be shifted between the points 31 and 32 from one side of the aircraft to the other, as indicated, and in this instance the rocket will provide means for maintaining the equilibrium of the aircraft about the longitudinal axis thereof with respect to lateral shifting of the center of gravity between the points 31 and 32. In the medium position of the rocket 30 the line of action of the thrust gases coincides with the vertical axis of the aircraft when the center of gravity is in the medium position 33.

In FIG. 4 there is indicated a VTOL aircraft 1''' of the same type indicated in FIG. 1, but having a rocket 40 which is both pivotal and movable in longitudinal directions. The rocket 40 may be pivoted about an axis paralleling the transverse axis of the aircraft. The rocket 40 is indicated in the range of the center of gravity 41.

The aircraft 1''' is operated with all engines 44, 45 and 47 operating initially (at take-off) to deflect the thrust gases 42, 43 and 46 substantially vertically downwardly. At such times the thrust gases 48 of the rocket 40 are also deflected substantially vertically downwardly (condition not shown). In the drawing, the thrust gases 42, 43, 46 and 48 are shown directed obliquely rearwardly after being shifted in order to provide a transition from vertical lifting of the aircraft to forward flight. During the transition the lifting jets 42 and 43 of the air-consuming lift-off engines 44 and 45 are well as the lifting jet 46 of the combination lift and cruising engine 47 are deflected only slightly rearwardly. Thus, a fourth component acting in the direction of the longitudinal axis of the aircraft is created, which results in accelerating the forward flight of the aircraft. In support of this action, the take-off assist rocket 40 is oriented in such a manner that it is tiltable into the direction of the deflected lift jet of the air-consuming engines 44, 45 and 47, so that its lift jet 48 also contributes to the forward acceleration of the aircraft. Because of the movability of the take-off assist rocket 40 it is also possible to maintain equilibrium of the aircraft about the transverse axis thereof during the transition.

During transition the lift engines 44 and 45 may be discontinued and the combination cruising and lift engine 47 may be operated to discharge thrust gases through the rearward nozzles 49. At such an instance the rocket 40 may also provide means for stabilizing the aircraft when this transition is accomplished.

In FIGS. 5 to 7 there is indicated a construction of harness or mounting mechanism for a rocket 50 which permits movement of the rocket 50 after it is mounted in directions longitudinally along the aircraft. In the embodiment indicated, the aircraft body 51 is provided with a cavity 52 at its underside, in which the harness mechanism is arranged. The harness mechanism includes longitudinally extending guide rails 54 of substantially U-shaped section which are mounted on each of the side walls 53, 53 of the cavity 52. Each of the guide rails 54 carries wheels 55, 55 having axles 308 upon which they are rotatable and which are secured to and thus carry a rocket suspension frame or carriage 56. To avoid double grinding, the wheels 55 which ride on one of the guide rails 54 have release bearings. The diameter of the wheels 55 are slightly smaller than the inner flanges of the guide rails 54 in order to avoid a sliding relative movement between the wheels and the guide rails.

A hydraulic adjusting device, generally designated 57, is provided for shifting the carriage 56 and a rocket 50 carried thereby in longitudinal directions. The device includes a fluid cylinder 57c which is pivotably mounted at its one end on a bracket 58 which is carried on a wall 309 at one end of the cavity 52 of the fuselage 51. A piston (not shown) is reciprocal within the cylinder 57c in response to the admission of control fluid through lines 57a and 57b which are connected to a fluid pressure source, the flow of which is controlled by means located in the pilot's control cabin for actuation by the pilot. The piston which is reciprocal in the cylinder 57c has a rod 57d which extends outwardly from the opposite end and is connected to the carriage 56. Thus the carriage 56 with the rocket 50 may be shifted by the pilot backwardly and forwardly along the frame 54 as desired during the take-off and subsequent maneuvering to constant level flight.

The rocket 50 is secured in the carriage by merely inserting the top thereof upwardly through the bottom of the carriage to cause an angular ring or projection 59 affixed to the rocket exterior surface to engage behind a latching dog 60 of a latching mechanism generally designated 310. The latching mechanism 310 includes a latch member which is pivotal about a pivot 61 with one arm terminating in the dog 60 and another arm terminating in a cam 64. The arm of the cam 64 is biased outwardly by a spring 62 carried on a boss formed on the upper end of the carriage 56 and a similar boss formed on the arm having the cam 64. The biasing of the spring 62 causes the latching dog 60 to engage below the bottom of the ring 59 and to latch the rocket 50 into position on the carriage. The upper surface of the ring 59 bears against the carriage 56. The reaction force resulting from the operation of the rocket is transmitted, without affecting the dog latch 60, to the carriage 56 through the axles 308 to the wheels 55 and the guide rails 54 and to the body 51 of the aircraft.

When it is desired to release the take-off assist rocket 50, two wedges 63, 63 are provided adjacent the tracks 54 in position to engage the cams 64 and spring open the dogs 60 to drop the rocket 50 when the carriage 56 is moved to a position at which the wedges 63 are aligned with the cams 64. Thus the pilot maneuvers the rocket 50 as desired along the rails 54 within the limits of the movement design range during the take-off stage. When it is desired to jettison the rocket after burnout, the piston rod 57d is moved outwardly to align the latching cams 64 with the wedges 63 which spring open the latching dogs 60. In some instances it is advantageous to provide means for assisting the discharge of the take-off rocket from the carriage 56, for example, an ejector placed in the area of the frontal end position of the cavity 52, which would be operated by hydraulic means or spring loading. After the rocket 50 is released, the flaps 65, which are indicated as extending outwardly and downwardly, are operated by a control in the pilot's cabin to cause them to move to a closed position in which they close the cavity 52.

Figure 9:
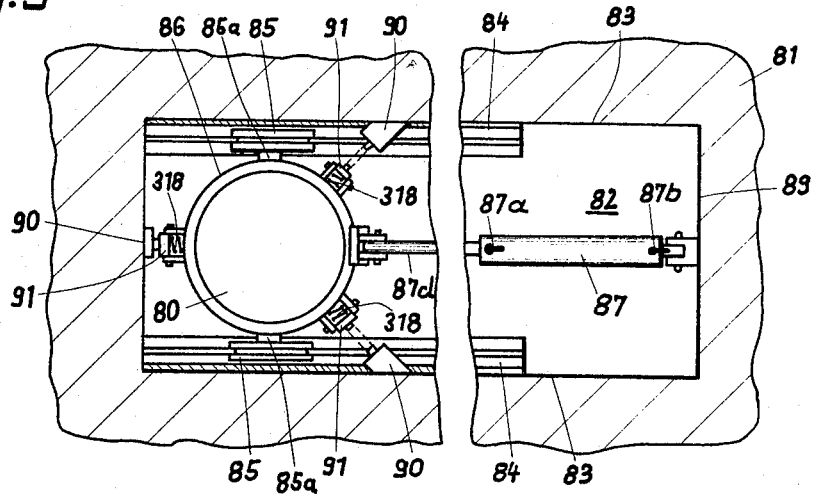
FIG. 9 is a top view of the mounting means for the rocket indicated in FIG. 8.

In FIGS. 8 and 9 there is indicated a mounting means or harness for accommodating a rocket 80 which permits moving of the rocket both longitudinally and pivotably. In the embodiment illustrated, the pivotal movement is about an axis paralleling the transverse axis of the aircraft. The mechanism is arranged in a cavity or shaft 82 of an aircraft body 81 which opens at the bottom, but may be closed by means of flap doors 92. The mechanism includes guide rails 84, 84 carrying wheels 85, 85 which support a cylindrical frame or carriage 86 through axles 85a. In order to avoid a double guiding, one of the wheels 85 has release bearings. The diameters of the wheels 85 are slightly smaller than the vertical dimension of the guide rails so as to avoid a sliding relative movement between the wheels and the guide rails. Hydraulic adjusting devices 87 and 88 are pivotably mounted on respective brackets carried by a wall 89. The devices 87 and 88 are provided for effecting a shifting of the rocket 80 or a pivoting thereof, respectively, as desired. Each of the devices 87 and 88 are controlled through hydraulic control lines 87a and 87b and 88a and 88b, respectively, through which a control fluid is directed for shifting piston rods 87d and 88d under the control of the pilot.

The rocket 80 is mounted in the carriage 86 in the same manner as the embodiment described in the FIGS. 5 and 7, employing latching elements 91 which engage around a projecting angular ring 314 which is secured to the rocket 80. The carriage includes a plurality of latching elements generally designated 91, each having an arm which terminates in a dog which engages around the ring 314, and an opposite arm which is biased outwardly by a spring 318. To jettison the rocket 80 after it has served its useful purpose, actuating means such as a solenoid 90 with a movable plunger (or a fluid-operated die element) is actuated via a connecting conduit 90a to deflect the arm portion of the latching elements 91 and cause the unlatching and release of rocket 80. After the rocket 80 is jettisoned or released, the doors 92 are closed.

In FIGS. 10 and 11, another embodiment of the invention is shown which provides means for longitudinally and pivotably mounting a rocket 100 within a bay or cavity 102 in an aircraft body 101. The rocket 100 is mounted for longitudinal movement and for universal pivotal movement about the axis of a ball pivot 108 secured to the top of the rocket.

The mounting means advantageously include rails 105, 105 which are secured to a top wall 103 in a cavity 102, and which are engaged by a slide 104 which carries the ball socket element 108. The ball socket 108 is secured to the top surface 107 of the rocket 100 and is pivotably held to the slide 104 by means of a sleeve nut 106 which is captive around the ball socket member 108. The ball socket 108 permits pivotal movement of the rocket 100 in longitudinal as well as transverse directions. Means are provided both for shifting the slide 104 with the rocket 100 in longitudinal directions and for pivoting the rocket 100 in desirable directions about the axis of the ball socket 108. The means for shifting the slide 104 comprise a hydraulic cylinder 109 which is supplied with control fluid through control lines 109a and 109b operated by the pilot to cause displacement of a piston rod member 109c which is connected to the slide 104 to thus move the slide 104 with the rocket 100 longitudinally.

For swiveling the take-off assist rocket 100 there is provided a plurality of hydraulic adjusting devices including hydraulic cylinders 111, 112, each having piston rods 111c and 112c which are pivotably connected to an encircling band or ring 324 into which the rocket 100 is slid when it is installed on the slide 104. The hydraulic adjusting device which extends at right angles to the plane of the drawing of FIG. 11 includes the piston rod 112c secured to the encircling band 324 at a location to permit transverse pivotal movement of the rocket 100, whereas the connecting rod 111c is located to permit the longitudinal pivoting movement of the rocket 100 about the axis of the ball joint 108.

In the embodiment of the mounting means indicated in FIGS. 10 and 11, after the combustion cutoff of the take-off assist rocket 100, the cavity 102 is closed by flaps (not shown). In this embodiment, jettison means are not shown but they could be provided in a manner similar to the other embodiments. A used rocket may be carried during flight and exchanged for a new one merely by unfastening the nut 106 and permitting the rocket 100 to slide downwardly through the encircling band 324. In some instances the encircling band is formed as an integral part of the exterior of the rocket 100, in which event it would also be necessary to disconnect the connecting rods 112c and 111c from the band 324 before the rocket is removed.

While specific embodiments of the invention have been shown and described in detail to illustrate the application of the inventive principles, it will be understood that the invention may be embodied otherwise without departing from such principles.

What is claimed is:

1. Take-off assist for VTOL aircraft having a plurality of lift engines with lift nozzles in front of and behind the center of gravity of the aircraft, comprising at least one take-off assist rocket movably mounted on the aircraft, which rocket is arranged to act at least approximately in the direction of the vertical axis of the aircraft, and has a lift at least equal to the loss in lift of the air-consuming lift engines caused by ground influence, said rocket having a combustion time at least equal to the climbing time of the aircraft within the range of ground influence.

2. Take-off assist according to claim 1, wherein said take-off assist rocket is suspended movably in the aircraft by mounting means permitting movement over a range which in the medium position of said rocket coincides with the medium position of the vertical axis of the aircraft.

3. Take-off assist according to claim 2, wherein said take-off assist rocket is mounted to the aircraft by mounting means movably in the direction of the longitudinal axis of the aircraft.

4. Take-off assist according to claim 1, wherein said take-off assist rocket is mounted to the aircraft by mounting means pivotably around an axis paralleling the transverse axis of the aircraft.

5. Take-off assist according to claim 1, wherein said take-off assist rocket is mounted to the aircraft by mounting means pivotably around an axis paralleling the longitudinal axis of the aircraft.

6. In an aircraft having means capable of producing substantially vertical lift thrust on each side of the center of gravity of the aircraft, the improvement comprising a thrust engine of relatively low power movably mounted in the vicinity of the center of gravity for generating variably directed thrust for compensating for any reduction of vertical thrust by said means for producing vertical thrust on each side of the center of gravity of the aircraft when close to the ground and for balancing the thrust in the take-off of such aircraft.

7. In an aircraft having means capable of producing substantially vertical lift thrust on each side of the center of gravity of the aircraft, the improvement comprising a thrust engine of relatively low power mounted in the vicinity of the center of gravity for generating variably directed thrust for compensating for any reduction of vertical thrust by said means for producing vertical thrust on each side of the center of gravity of the aircraft when close to the ground and for balancing the thrust in the take-off of such aircraft, and means movably mounting said trust engine on said aircraft.

8. In an aircraft having means capable of producing substantially vertical lift thrust on each side of the center of gravity of the aircraft, the improvement comprising a thrust engine of relatively low power mounted in the vicinity of the center of gravity for generating variably directed thrust for compensating for any reduction of vertical thrust by said means for producing vertical thrust on each side of the center of gravity of the aircraft when close to ground and for balancing the thrust in the take-off of such aircraft, and means movably mounting said thrust engine on said aircraft, said mounting means including means for shifting said thrust engine for producing relatively small amount of thrust in a longitudinal direction in respect to the axis of the aircraft.

9. In an aircraft having means capable of producing substantially vertical lift thrust on each side of the center of gravity of the aircraft, the improvement comprising a thrust engine of relatively low power mounted in the vicinity of the center of gravity for generating variably directed thrust for assisting in the take-off of such aircraft, and means movably mounting said thrust engine on said aircraft, said mounting means including a control mechanism for shifting said thrust engine in a longitudinal direction in respect to the axis of the aircraft and for pivoting said thrust engine.

10. In an aircraft having means capable of producing substantially vertical lift thrust on each side of the center of gravity of the aircraft, the improvement comprising a thrust engine of relatively low power mounted in the vicinity of the center of gravity for generating variably directed thrust for assisting in the take-off of such aircraft, and means movably mounting said thrust engine on said aircraft including means for shifting said engine in longitudinal directions in respect to the axis of the aircraft and means for pivoting said thrust engine about an axis substantially perpendicular to the longitudinal axis of the aircraft.

11. In an aircraft having means capable of producing substantially vertical lift thrust on each side of the center of gravity of the aircraft, the improvement comprising a thrust engine of relatively low power mounted in the vicinity of the center of gravity for generating variably directed thrust for assisting in the take-off of such aircraft, and means movably mounting said thrust engine on said aircraft, said means including means for shifting said engine in longitudinal directions in respect to the axis of the aircraft and means for pivoting said thrust engine about an axis substantially parallel to the longitudinal axis of the aircraft.

12. In an aircraft having at least two air-consuming lift engines in front of the center of gravity and at least one air-consuming combination lift engine and thrust engine aft of the center of gravity which provides lifting thrust during take-off and rearward thrust for cruising after take-off, the improvement comprising a rocket engine movably mounted on said aircraft in the vicinity of the center of gravity for directing a thrust in a direction to compensate for any reduction in lift due to ground effects on said lift engines and said combination lift engine and thrust engine.

13. In an aircraft having at least two air-consuming lift engines in front of the center of gravity and at least one air-consuming combination lift engine and thrust engine located aft of the center of gravity which provides lifting thrust during take-off and rearward thrust for cruising after take-off, the improvement comprising a rocket engine mounted on said aircraft in the vicinity of the center of gravity, and means mounting said rocket for movement upon said aircraft for varying the location and direction at which the thrust gases are discharged therefrom for directing a thrust in a direction to compensate for any reduction in lift due to ground effects on said lift engines and said combination lift engine and thrust engine.

14. In an aircraft having at least two air-consuming lift engines in front of the center of gravity and at least one air-consuming combination lift engine and thrust engine which provides lifting thrust during take-off and rearward thrust for cruising after take-off, which is located aft of the center of gravity, the improvement comprising a rocket engine mounted on said aircraft in the vicinity of the center of gravity, and means mounting said rocket for movement upon said aircraft for varying the location and direction at which the thrust gases are discharged therefrom, said means mounting said rocket being movable in longitudinal direction for shifting said rocket longitudinally.

15. In an aircraft having at least two air-consuming lift engines in front of the center of gravity and at least one air-consuming combination lift engine and thrust engine which provides lifting thrust during take-off and rearward thrust for cruising after take-off, which is located aft of the center of gravity, the improvement comprising a rocket engine mounted on said aircraft in the vicinity of the center of gravity said means mounting said rocket permitting pivotal movement of said rocket for directing thrust gases obliquely for directing a thrust in a direction to compensate for any reduction in lift due to ground effects on said lift engines and said combination lift engine and thrust engine.

16. In an aircraft according to claim 15, wherein said means mounting said rocket permits pivotal movement of said rocket in transverse directions.

17. In an aircraft according to claim 15, wherein said means mounting said rocket permits pivotal movement of said rocket in longitudinal directions.

18. Mounting means for an assist rocket for an aircraft and the like comprising a trackway, means for securing said trackway to the aircraft, a carriage movable along said trackway, means on said carriage for mounting a rocket thereon, and control means for displacing said carriage with said rocket for varying the location at which said rocket will operate, said carriage being substantially tubular, said rocket being of the same tubular configuration and adapted to be inserted into the tubular carriage.

19. A mounting device for a rocket and similar relatively small thrust engine, comprising a trackway, means for securing said trackway to the body of an aircraft, a member movable along said trackway, a latch on said carriage for securing a rocket thereto, and control means for shifting said carriage to vary the location of operation of said rocket.

20. A mounting device for a rocket and similar relatively small thrust engine, comprising a trackway, means for securing said trackway to the body of an aircraft, a member movable along said trackway, said member having means for securing a rocket thereto, and control means for shifting said member to vary the location of operation of said rocket, said member comprising a slide, and ball joint means on said slide for pivotably suspending a rocket thereon, said control means including means for shifting said slide and for pivoting said rocket.

21. A mounting device for a rocket and similar relatively small thrust engine, comprising a trackway, means for securing said trackway to the body of an aircraft, a member movable along said trackway, said member having means for securing a rocket thereto, and control means for shifting said member to vary the location of operation of said rocket, said member comprising a slide, and ball joint means on said slide for pivotably suspending a rocket thereon, said rocket including a ball member adapted to be secured to said rocket, said slide having a recess accomodating said ball member, and detachable nut means securing said rocket ball member at the location of said slide and pivotably suspending said rocket.

22. A mounting device for a rocket and similar relatively small thrust engine, comprising a trackway, means for securing said trackway to the body of an aircraft, a member movable along said trackway, said member having means for securing a rocket thereto, and control means for shifting and pivoting said member and pivoting said rocket to vary the location of operation of said rocket and the direction of its thrust, said member comprising a carriage having a central opening for receiving a rocket, and latching means on said carriage for latching said rocket to said carriage.

23. A mounting device for a rocket and similar relatively small thrust engine, comprising a trackway, means for securing said trackway to the body of an aircraft, a carriage movable along said trackway, said carriage having a central opening for receiving a rocket and wheels which are engageable on said trackway for rolling movement thereon, latching means comprising a latch member pivotable on such carriage, and a ring member adapted to be secured to the rocket exterior surface, having a lower edge which is engageable by said latch means when the rocket is positioned in said carriage.

24. A mounting device for a rocket and similar relatively small thrust engine, comprising a trackway, means for securing said trackway to the body of an aircraft, a member movable along said trackway, control means including means for shifting said member and for pivoting the rocket, and latching means for latching said rocket to said member, said latching means comprising a latch member pivotable on said member, and a ring member adapted to be secured to the rocket exterior surface, having a lower edge which is engageable by said latch member when the rocket is positioned in said carriage, and means on said trackway engageable with said latch member for moving said latch member for releasing said rocket.

25. A device according to claim 24, wherein said means for releasing said rocket comprises a wedge member.

26. A device according to claim 24, wherein said means for releasing said rocket includes a displaceable element and control means for displacing said element.

27. A device for mounting an apparatus such as a take-off assist rocket on an aircraft comprising a trackway carried by said aircraft, a slide movable along said trackway, said slide having a recess, a ball member adapted to be secured to a rocket and being pivotable in the recess of said slide, captive nut means surrounding said ball member and threaded around said slide to hold said ball member to said slide and to permit universal pivotal movement of an object such as a rocket secured to said ball member, and means for shifting said slide and for pivoting said ball member about its axis in selected directions.

28. A device according to claim 27 including separate fluid-actuated control means for shifting said slide and for pivoting said ball member about its axis.

29. A vertical take-off and landing aircraft comprising a fuselage having an air foil wing arranged in the center of gravity of said aircraft, at least two lift engines mounted in a fixed position on said fuselage before the center of gravity of said aircraft, at least one combustion forward propulsion and lift engine mounted on said fuselage behind the center of gravity of said aircraft and providing corrective lift about the center of gravity in respect to the lift provided by said lift engines, said combustion forward propulsion and lift engine having means for selectively directing thrust gases substantially vertically and substantially horizontally and means adjacent the discharge of said lift engines and said combustion forward propulsion and lift engine for deflecting propelling gases from the vertical in any selected direction, and a rocket mounted on said aircraft in the vicinity of the center of gravity for supplying an assist-thrust for take-off purposes for directing a thrust in a direction to compensate for any reduction in lift due to ground effects on said lift engines and said combination lift engine and thrust engine.

30. A vertical take-off and landing aircraft comprising a fuselage, an air foil wing extending outwardly from each side of said fuselage adjacent the center of gravity of said aircraft, at least two lift engines mounted on said fuselage forward of the center of gravity, means associated with said lift engines for deflecting thrust gases forwardly, rearwardly and laterally, at least one combination forward propulsion and lift engine mounted on said fuselage behind the center of gravity of said aircraft and providing corrective lift about the center of gravity in respect to the lift provided by said lift engines, said combination forward propulsion and lift engine having means for selectively directing thrust gases substantially vertically and alternatively substantially horizontally for providing thrust for lift and for propulsion, respectively, and a rocket mounted on said aircraft in the vicinity of the center of gravity for supplying an assist-thrust for take-off purposes for directing a thrust in a direction to compensate for any reduction in lift due to ground effects on said lift engines and said combination lift engine and thrust engine.

31. In an aircraft having at least two air-consuming lift engines in front of the center of gravity and at least one air-consuming combination lift engine and thrust engine located aft of the center of gravity which provides lifting thrust during take-off and rearward thrust for cruising after take-off, the improvement comprising a rocket engine mounted on said aircraft in the vicinity of the center of gravity, and means mounting said rocket for movement upon said aircraft for varying the location and direction at which the thrust gases are discharged therefrom, said mounting means comprising a trackway adapted to be secured to the aircraft, a carriage movable along said trackway, means on said carriage for mounting a rocket thereon, and control means for displacing said carriage with said rocket for varying the location at which said rocket will operate.

References Cited by the Examiner

UNITED STATES PATENTS

| | | | |
|---|---|---|---|
| 2,783,003 | 2/1957 | Ralston et al. | 244—54 |
| 3,132,827 | 5/1964 | Roy et al. | 244—58 |
| 3,155,342 | 11/1964 | Bolkow et al. | 244—12 |

FOREIGN PATENTS 839,021  12/1938  France.

MILTON BUCHLER, *Primary Examiner.*

L. C. HALL, *Assistant Examiner.*